United States Patent
Chen et al.

(10) Patent No.: US 8,963,855 B2
(45) Date of Patent: Feb. 24, 2015

(54) METHOD FOR UNLOCKING A MOBILE DEVICE, MOBILE DEVICE AND APPLICATION PROGRAM FOR USING THE SAME

(75) Inventors: Chien-Yuan Chen, Taipei (TW); Hang-Fang Chen, Taipei (TW); Yu-Shu Chen, Taipei (TW)

(73) Assignee: Shuttle Inc., Taipei (TW)

( * ) Notice: Subject to any disclaimer, the term of this patent is extended or adjusted under 35 U.S.C. 154(b) by 504 days.

(21) Appl. No.: 13/356,792

(22) Filed: Jan. 24, 2012

(65) Prior Publication Data

US 2013/0113723 A1 May 9, 2013

(30) Foreign Application Priority Data

Nov. 7, 2011 (TW) ............................. 100140606 A

(51) Int. Cl.
  *G06F 3/041* (2006.01)
  *G06F 3/0488* (2013.01)
  *G06F 21/30* (2013.01)
  *G06F 3/0481* (2013.01)

(52) U.S. Cl.
  CPC ............ *G06F 3/04883* (2013.01); *G06F 21/30* (2013.01); *G06F 2203/04808* (2013.01); *G06F 3/04817* (2013.01)
  USPC .......................... 345/173; 345/174; 178/18.01

(58) Field of Classification Search
  CPC .... G06F 3/0488; G06F 3/04883; G06F 3/044
  USPC ...................... 345/173–179; 178/18.01–18.04
  See application file for complete search history.

(56) References Cited

U.S. PATENT DOCUMENTS

| | | | |
|---|---|---|---|
| 8,385,885 B2 * | 2/2013 | Hainzl | 455/411 |
| 2010/0099394 A1 | 4/2010 | Hainzl | |
| 2010/0279657 A1 * | 11/2010 | Matsuo | 455/411 |
| 2010/0306705 A1 | 12/2010 | Nilsson | |
| 2011/0252648 A1 * | 10/2011 | Votolato et al. | 30/153 |
| 2012/0060128 A1 * | 3/2012 | Miller et al. | 715/863 |
| 2012/0208501 A1 * | 8/2012 | Tsuda | 455/411 |
| 2012/0212430 A1 * | 8/2012 | Jung et al. | 345/173 |

FOREIGN PATENT DOCUMENTS

| | | |
|---|---|---|
| TW | 201020876 A | 6/2010 |
| TW | 201137658 A | 11/2011 |

OTHER PUBLICATIONS

TW Office Action dated Jan. 13, 2014 of the corresponding Taiwan patent application No. 100140606.

* cited by examiner

*Primary Examiner* — Kimnhung Nguyen
(74) *Attorney, Agent, or Firm* — Chun-Ming Shih; HDLS IPR Services

(57) ABSTRACT

A method for unlocking a mobile device is disclosed. When the mobile device is in the lock mode, the touch panel screen on the mobile device detects a multi-touch action simultaneously performed by users. The users perform the multi-touch action on a plurality of the touch points displayed on the touch panel screen. If the multi-touch action satisfies a predetermined unlock condition of the mobile device, the mobile device switches from a lock mode to an unlock mode. The simultaneous multi-touch action is provided to users for unlocking the mobile device. Thus, the simultaneity of the action is utilized to shortening the operating time of the unlock process.

12 Claims, 15 Drawing Sheets

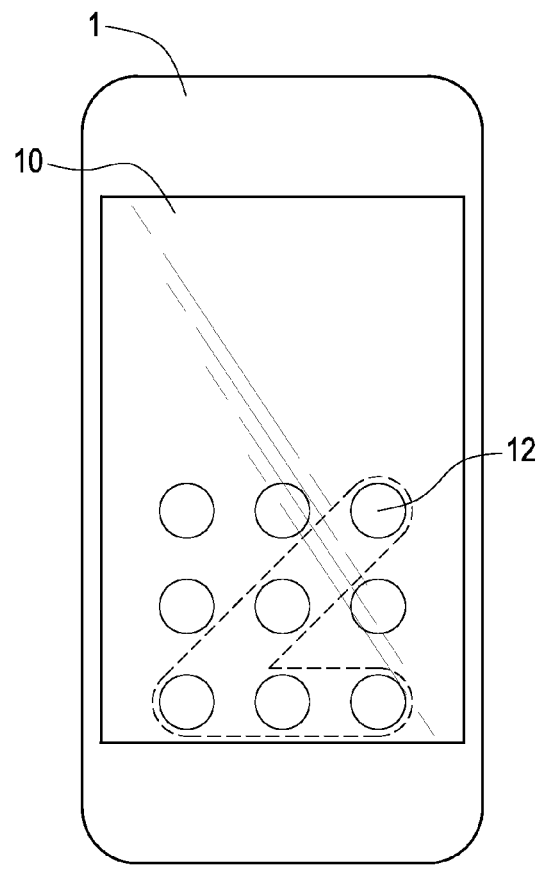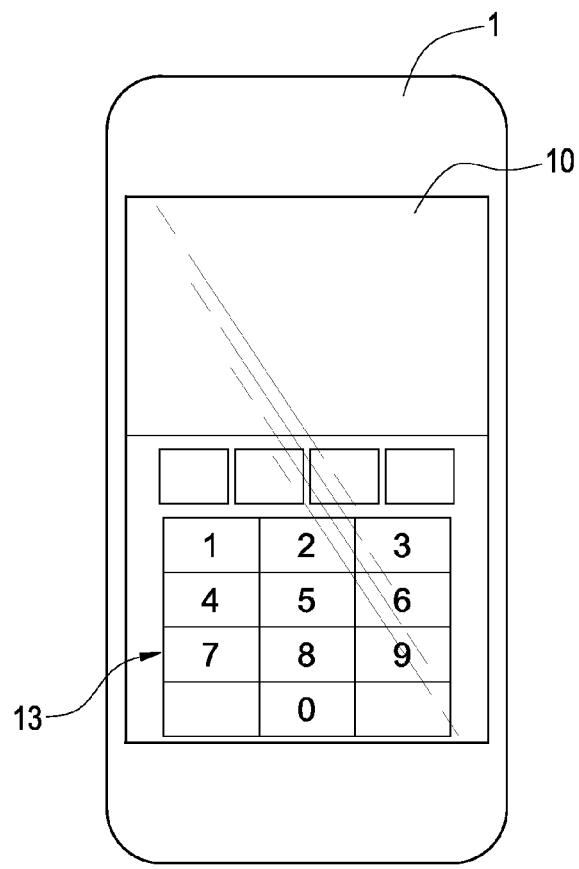
FIG.1B
PRIOR ART
FIG.1C
PRIOR ART

METHOD FOR UNLOCKING A MOBILE DEVICE, MOBILE DEVICE AND APPLICATION PROGRAM FOR USING THE SAME

BACKGROUND OF THE INVENTION

1. Field of the Invention

The present invention relates to an unlock method, in particular, the present invention relates to an unlock method used for switching from lock mode switches to an unlock mode on a mobile device.

2. Description of Prior Art

In recent years, electronic devices become popular as the semiconductor industry develops. Various smart mobile devices, such as smart phones, personal digital assistants (PDA), and tablet PCs are part of everyday life making life more convenient with their strong computation capability.

Generally speaking, the above mentioned smart phones use buttons on touch panel screen instead of traditional mechanical buttons. Users switch between lock mode/unlock mode of the mobile device via operations on the touch panel screen. When the mobile device is in the lock mode, the mobile device cannot be manipulated. When the mobile device is in the unlock mode, users are free to launch all kinds of application programs installed in the mobile device. Thus, the lock mode provides protection on the mobile device from being manipulated without authorization by a third party.

FIG. 1A is a schematic diagram of a lock mode for a mobile device according the first embodiment of the prior art. As shown in the diagram, a mobile device 1 provides a touch panel screen 10, and the mobile device 1 is in the lock mode, an unlock icon is displayed on the touch panel screen 10, for example an unlock bar 11. When users want to unlock the mobile device 1, users touch the unlock bar 11, and drag the unlock bar 11 to a predetermined area or slide along a predetermined path for performing an unlock action.

Though, the above mentioned slide unlock provides a simple screen lock function and does not provide a password protection. Any person may drag the unlock bar 11 on the touch panel screen 10 to unlock. Thus, the operating time of the unlock action is short, the mobile device 1 is not provided any protection in the slide unlock.

FIG. 1B is a schematic diagram of a lock mode for a mobile device according the second embodiment of the prior art. As shown in the diagram, a nine-square division unlock pattern 12 is displayed on the touch panel screen 10 of the mobile device and users follows an unlock path formed by a predetermined touch sequence on the nine-square division unlock pattern 12. Though the unlock method provides a lock function with protection function identical to a password, it is difficult to the users to memorize the beginning points and ending points on the above unlock path and forget the password sequence. The unlock path may not be a straight line. When users want to unlock, users have to look at the touch panel screen 10 attentively to assure that users touch the right sequence. The process is inconvenient to users, and the operating time of an unlock action is long accordingly.

FIG. 1C is a schematic diagram of a lock mode for a mobile device according the third embodiment of the prior art. The diagram demonstrates an unlock method of inputting a password, a set of English letters, numbers, or an unlock password button combination 13 is displayed on the touch panel screen 10 of the mobile device 1. The users touch the screen and input the correct password.

The above mentioned via the unlock method of inputting a password has the highest security. Yet, the process inputting the password is complicated, the users have to press different buttons for inputting different letters or numbers. Thus, the operating time of the unlock action is longer. In addition, when the dimension of the mobile device 1 is small, the unlock password buttons 13 displayed on the touch panel screen 10 may become too small to recognize, or the buttons spacing may become too small for human fingers to press which may lead to incorrect input from time to time.

In terms of the problems, it is desired to provide an innovative method for unlocking a mobile device, which both provide lock method with the protection function identical to the password and the protection function without password protection. Also, the operating time of an unlock action is short and effective.

SUMMARY OF THE INVENTION

The objective of the present invention is to provide a method for unlocking a mobile device and a mobile device and application program for using the method for shortening the operation time of an unlock action via the simultaneity of touch action, and provide a lock function with password protection or without password protection via setting up the quantity and the location of the touch points and the unlock points.

In order to accomplish the above targets, when the mobile device is in the lock mode, the touch panel screen on the mobile device detects a multi-touch action simultaneously performed by users. The users perform the multi-touch action on a plurality of the touch points displayed on the touch panel screen. If the multi-touch action satisfies a predetermined unlock condition of the mobile device, the mobile device switches from a lock mode to an unlock mode.

Compare to prior art, the advantages provided by the present invention are, users perform unlock of a mobile device via a simultaneous multi-touch action according to the present invention. Traditionally, the operation time to use continuous gestures (such as inputting a password or performing a gesture) to unlock a mobile device is long. The operating time issue is resolved in the present invention.

Further, users are allow to set up the display quantity and the display location of the touch points displayed on the touch panel screen, and set up the quantity and the location of the unlock points used for unlocking depending on their requirements. When the quantity of the touch points and the unlock points is the same, the method provides a lock function without password protection, which means any person can touch unlock points to unlock the device. If the quantity of the touch points is higher than the quantity of the unlock points, the method provides a lock function without password protection.

Thus, it is convenient to users to simultaneously perform a multi-touch action for performing an unlock action with or without password protection.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

FIG. 1B is a schematic diagram of a lock mode for a mobile device according the second embodiment of the prior art;

FIG. 1C is a schematic diagram of a lock mode for a mobile device according the third embodiment of the prior art;

DETAILED DESCRIPTION OF THE INVENTION

Figure 1A:
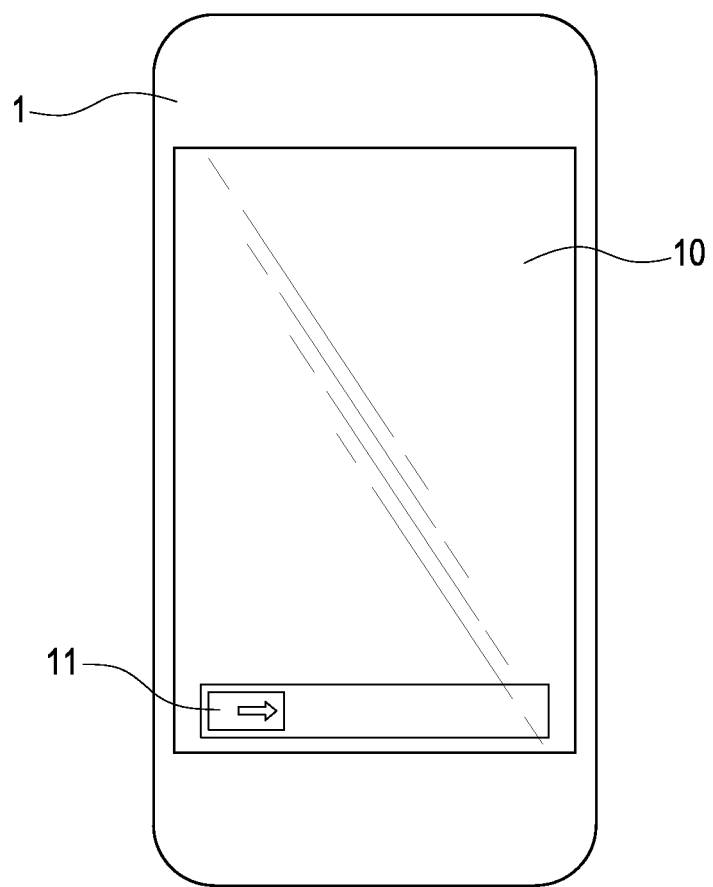
FIG. 1A is a schematic diagram of a lock mode for a mobile device according the first embodiment of the prior art.
Figure 2:
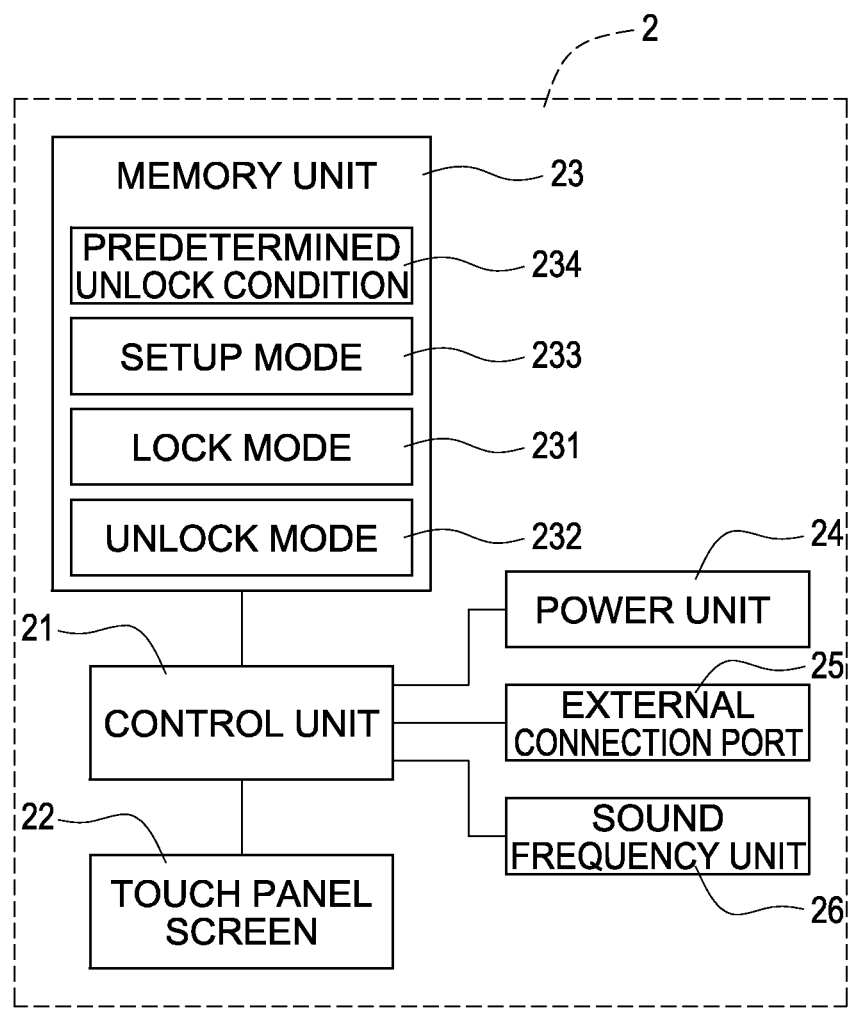
FIG. 2 is a block diagram of a preferred embodiment according to the present invention.

FIG. 2 is a block diagram of a preferred embodiment according to the present invention. The present invention discloses a mobile device 2, such as a smart phone, personal digital assistant (PDA), laptop computer, tablet computer, and is not limited thereto. The mobile device 2 comprises a control unit 21, a touch panel screen 22, and a memory unit 23, and the control unit 21 electrically connected to the touch panel screen 22 and the memory unit 23.

The memory unit 23 is stored with a lock mode 231 and an unlock mode 232 respectively provided to the mobile device 2 to perform under different modes. When the mobile device 2 is in the lock mode 231, the touch panel screen 22 and other buttons (not shown in the diagram) are locked on the mobile device 2, an user is not allowed to perform any operation on the mobile device 2 before the mobile device 2 is unlock. When the mobile device 2 is in the unlock mode 232, all functions provided on the mobile device 2 are enabled.

The memory unit 23 is further stored with a setup mode 233. When the mobile device 2 is in the unlock mode 232, the user controls the mobile device 2 to enable the setup mode 233. Under the setup mode 233, the touch panel screen 22 detects a multi-touch action performed by the user to set up a predetermined unlock condition 234 of the mobile device 2.

When the mobile device 2 is in the lock mode 231, the user performs simultaneous multi-touch action on the touch panel screen 22, the control unit 21 determines if the multi-touch action satisfies the predetermined unlock condition 234. If the multi-touch action satisfies the predetermined unlock condition 234, the control unit 21 controls the mobile device 2 to switch from the lock mode 231 to the unlock mode 232.

The mobile device 2 is installed with other components respectively provides different functions. For example, the mobile device 2 comprises a power unit 24, at least one external connection port 25, and a sound frequency unit 26 etc. respectively and electrically connected to the control unit 21.

The power unit 24 can be a battery for providing power required to operate the mobile device 2. The external connection port 25 can be connection ports comprising an universal Serial Bus (USB) connector, an External Serial Advance Technology Attachment (e-SATA) connector, a High Definition Multimedia Interface (HDMI) connector, a DisplayPort connector etc. for establish connection to different external devices (not shown in the diagram), and is not limited thereto. The sound frequency unit 26 is used for processing sound frequency signals of the mobile device 2, and the sound frequency unit 26 connects to speakers and microphones for receiving external sound frequency signals, and playing the processed sound frequency signals. The above mentioned is a preferred embodiment of the present invention and the scope is not limited thereto.

FIG. 3A to FIG. 3D are respectively the first setup action schematic diagram to the fourth setup action schematic diagram according to a preferred embodiment of the present invention. As shown in the diagram, the user controls mobile device 2 according to the present invention to enable the setup mode 233, where the user sets up the predetermined unlock condition 234 of the mobile device 2.

Figure 3A:
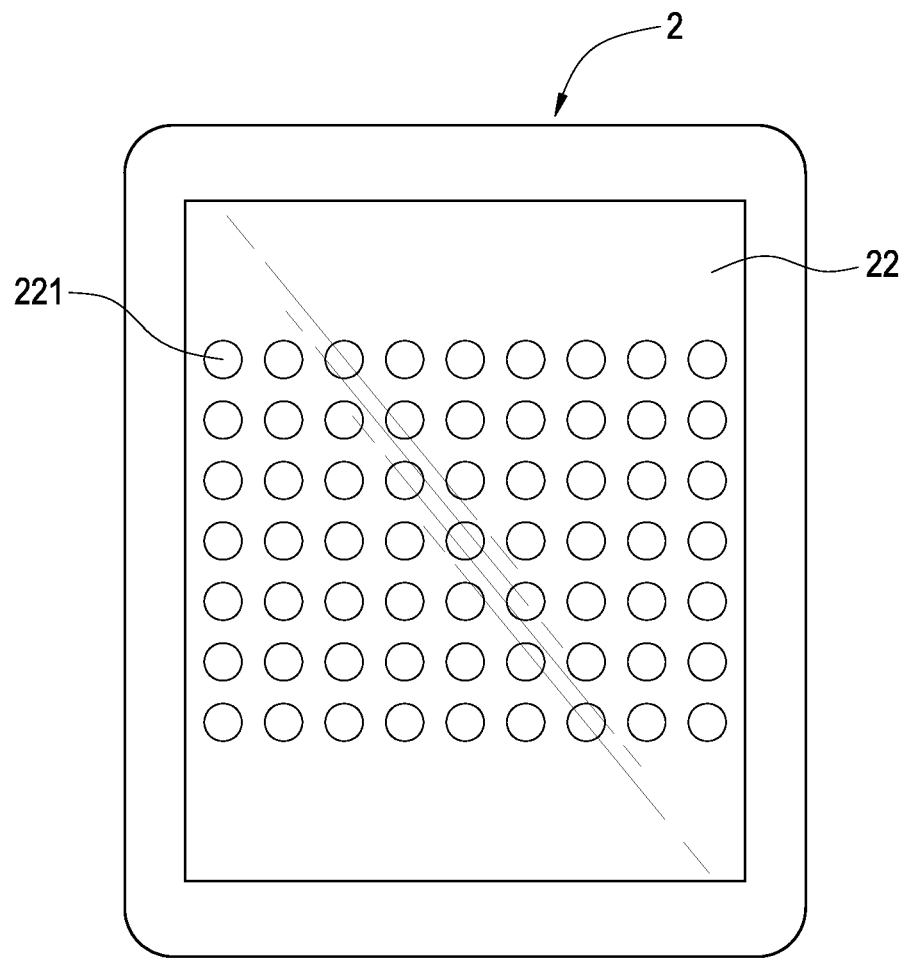
FIG. 3A is a first setup action schematic diagram of a preferred embodiment according to the present invention.
Figure 3B:
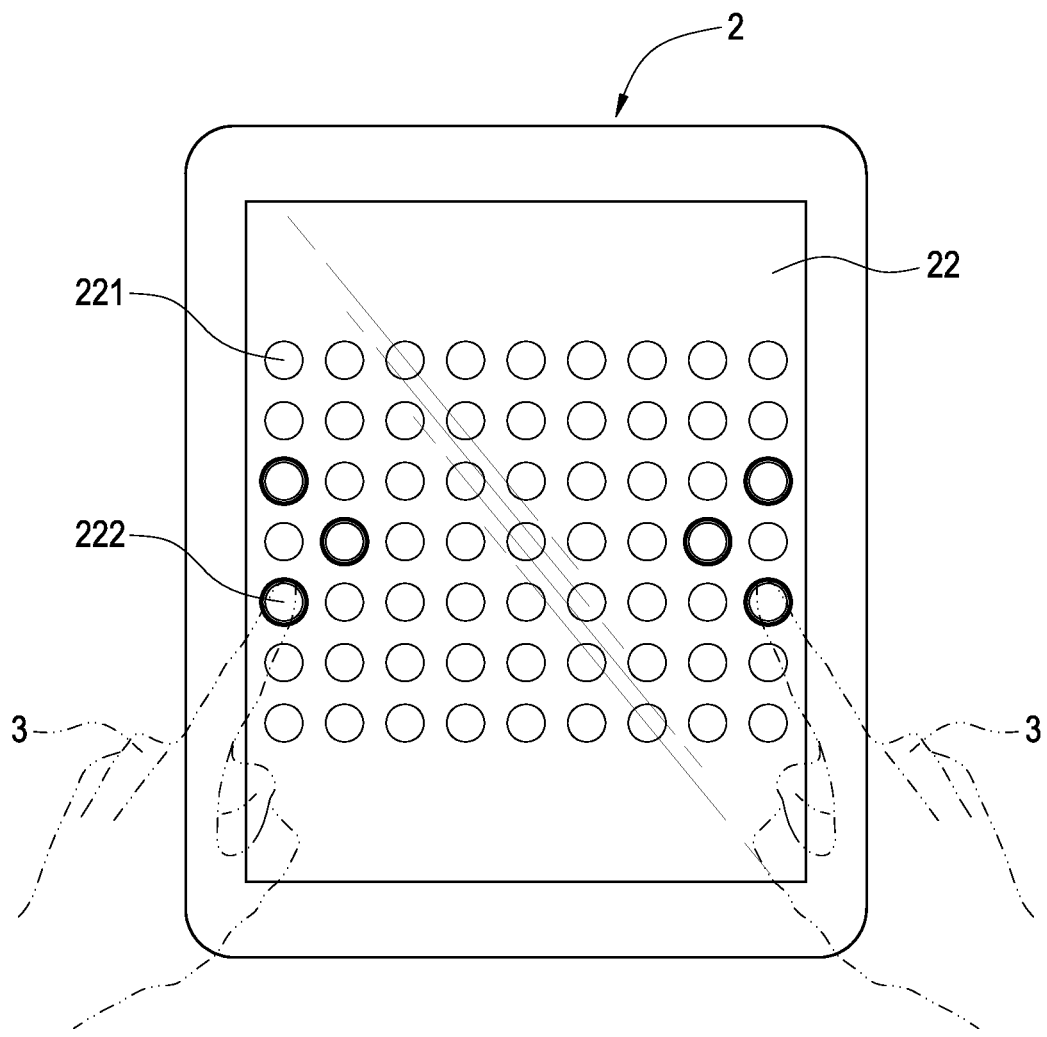
FIG. 3B is a second setup action schematic diagram of a preferred embodiment according to the present invention.

As shown in FIG. 3A, when the mobile device is in the setup mode 233, the mobile device 2 displays a plurality of the setup points 221 on the touch panel screen 22 so that the user is allow to perform the touch setup. In further details, the quantity and the location of the setup points 221 on the display is written in the mobile device 2 by default in the factory. The display and touch of the setup points 221 are supported by the mobile device 2. As shown in FIG. 3B, the user uses an external object 3, such as a stylus pen or fingers to touch the setup points 221. The setup points 221 touched is set up as touch points 222. In details, the user optionally touches the plurality of the setup points 221. The quantity and the location of the touch points 222 are set up among the plurality of the setup points 221.

When the mobile device 2 is in the lock mode 231, only the touch points 222 are displayed on the touch panel screen 22, the user performs a multi-touch action on the touch points 222 to satisfy the predetermined unlock condition 234 (detailed in the following).

Figure 3C:
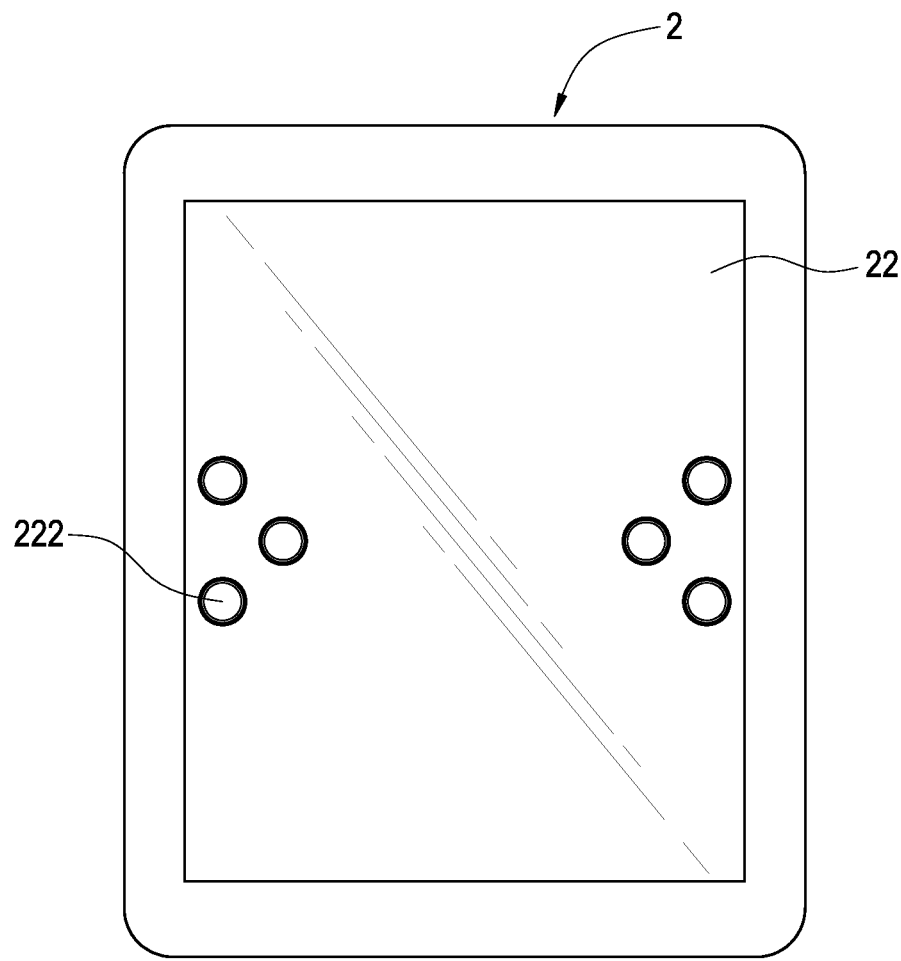
FIG. 3C is a third setup action schematic diagram of a preferred embodiment according to the present invention.
Figure 3D:
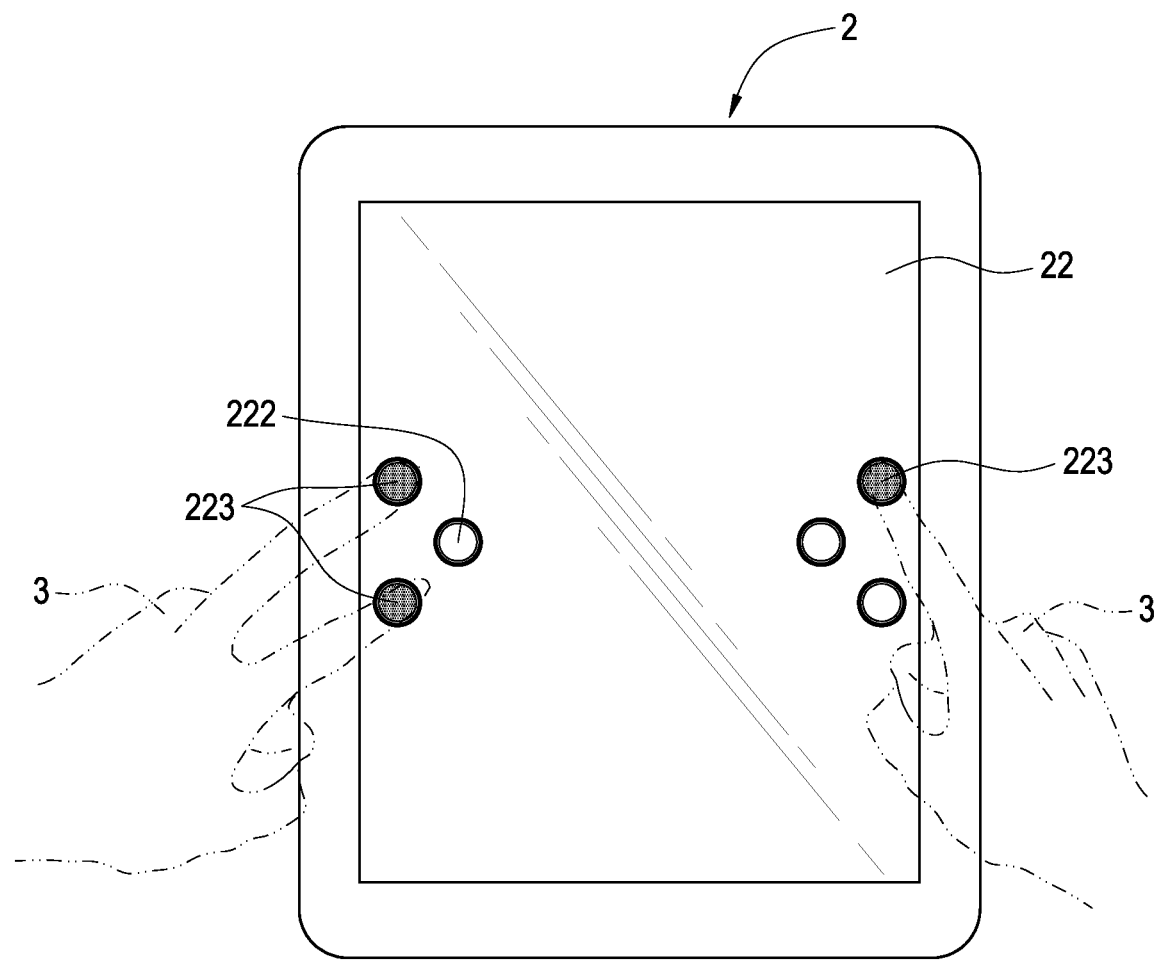
FIG. 3D is a fourth setup action schematic diagram of a preferred embodiment according to the present invention.

When the user finish and confirmed the setup of touch points 222, the touch panel screen 22 hide other setup points 221 which are not set up, and only reserves the touch points 222 which are set up (as shown in FIG. 3C). Next, as shown in FIG. 3D, the user optionally touches the touch points 222 via the external object 3 to set up unlock points 223 of the predetermined unlock condition. In details, the quantity and the location of the unlock points 223 are set up among the touch points 222.

In the example shown in FIG. 3D, the quantity of the plurality of the touch points 222 is six points, and the quantity of the plurality of the unlock points 223 is three points. When the mobile device 2 is in the lock mode 231, only the six touch points 222 are displayed on the touch panel screen 222. If the user want to perform an unlock action, the user has to simultaneously touch the three unlock points 223 to satisfy the predetermined unlock condition 234. If the location or the quantity of the touch made by the user is incorrect, or the touch is not simultaneously, the control unit 21 determines the touch action does not satisfy the predetermined unlock condition 234 and the mobile device 2 remains to be in the lock mode 231.

Figure 4:
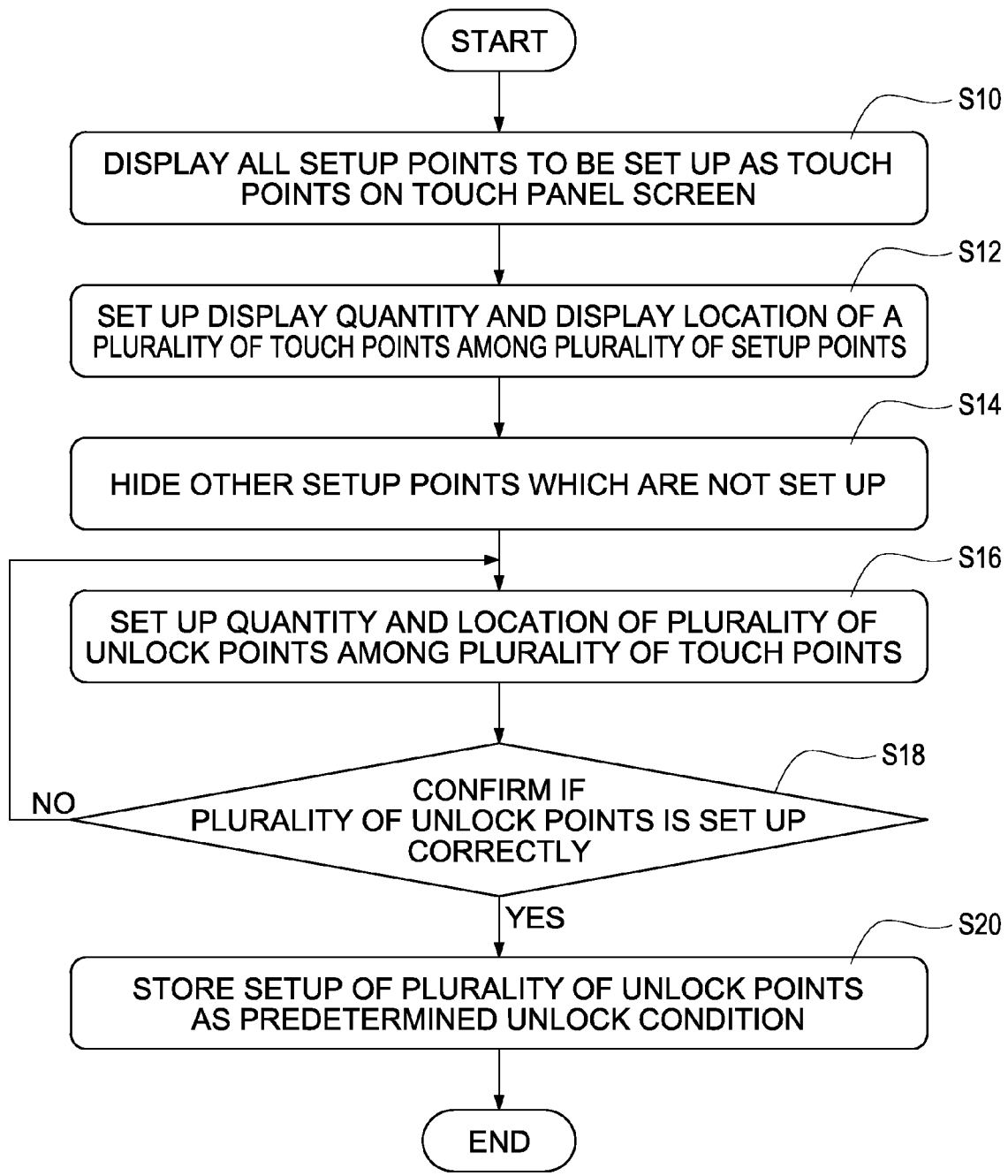
FIG. 4 is a setup flow chart of a preferred embodiment according to the present invention.

FIG. 4 is a setup flow chart of a preferred embodiment according to the present invention. First, the mobile device 2 is enabled to be in the setup mode 233. In the setup mode 233, all the setup points 221 to be set up as the touch points 222 are displayed on the touch panel screen 22 (step S10). Next, the touch panel screen 22 detects an external touch action to set up the display quantity and the display location of a plurality of the touch points 222 among the plurality of the setup points 221 (step S12).

When the plurality of the touch points 222 is set up, the mobile device 2 hides other setup points 221 which are not set up (step S14). Though, hiding the other setup points 221 which are not set up is a step made convenient for the user to set up the unlock points 223 in the following. The step S14 is not mandatory, the mobile device 2 is allowed to choose to display all the setup points 221 and skip the hiding step, and the scope is not limited thereto.

After the step S12, the display quantity and the display location of the plurality of the touch points 222 are set up, the touch panel screen 22 detects a multi-touch action made by the user to set up the quantity and the location of the plurality of the unlock points 223 among the plurality of the touch points 222 (step S16). To avoid setup errors made by the user, the mobile device 2 requests the user to confirm if the plurality of the unlock points 223 is set up correctly (step S18). When the user confirms the setup is correct, the control unit 21 stores the setup of the unlock points 223 as the predetermined unlock condition 234 (step S20). In details, the quantity and the location of the unlock points 223 is stored as the predetermined unlock condition 234. Thus, when the mobile device 2 is in the lock mode 231, the user has to perform a simultaneous multi-touch action on the touch panel screen 22 to satisfy the predetermined unlock condition 234 stored previously for switching the mobile device 2 from the lock mode 231 to the unlock mode 232.

The confirmation method in the above step S18 includes the following:

The first confirmation method: after the step S16, the mobile device 2 requests the user to input the quantity and the location of the plurality of the unlock points 223 again. When the user finishes the input, the control unit 21 determines if the input content of the former and the later is the same. If the control unit 21 determines yes, the method moves to the step S20; if not, the method moves back to the step S16 to request the user to set up the plurality of the unlock points 223 again.

The second confirmation method: after the step S16, the plurality of the touch points 222 and the plurality of the unlock points 223 which have been set up, are simultaneously displayed on the touch panel screen 22 of the mobile device 2 with distinguishing features such as different colors or lines so that the user is allowed to move to confirmation process. When the user confirms and presses the confirm button (not shown in the diagram), the method moves to the step S20 to stores the setup. If the user presses the cancel button (not shown in the diagram), the method moves to the step S16, the user sets up the plurality of the unlock points 223 again.

The third confirmation method: after the step S16, the plurality of the setup point 221, the touch point 222 and the unlock point 223 are simultaneously displayed on the touch panel screen 22 of the mobile device 2 with distinguishing features such as different colors or lines so that the user is allowed to move to confirmation process. When the user confirms and presses the confirm buttons, the method moves to the step S20 to store the setup. If the user presses the cancel button, the method moves back to the step S16, the user sets up the plurality of the unlock points 223 again.

Figure 5:
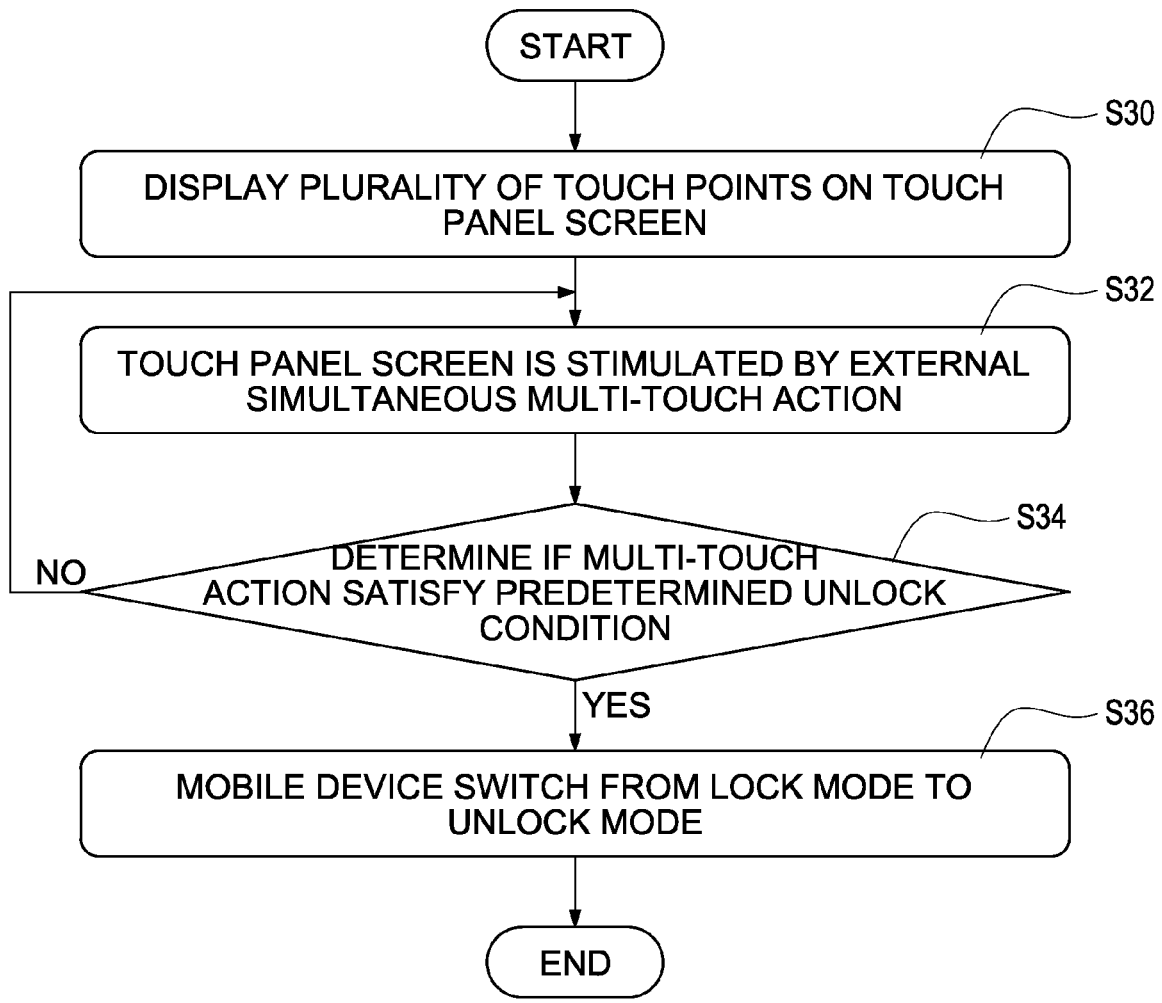
FIG. 5 is an unlock flow chart of a preferred embodiment according to the present invention.

FIG. 5 is an unlock flow chart of a preferred embodiment according to the present invention. First, when the mobile device 2 is in the lock mode 231, the plurality of the touch points 222 are displayed on the touch panel screen 22 of the mobile device 2 (step S30). The display quantity and the display location of the plurality of the touch points 222 are set up by the user in the setup mode 233 (as shown in FIG. 3C).

The touch panel screen 22 detects an external simultaneous multi-touch action (step S32), wherein the multi-touch action is made by an external object 3, and the touch location matches the display location of the plurality of the touch points 222. Next, the mobile device 2 determines if the multi-touch action satisfies the predetermined unlock condition 234 set up by the user (step S34), which means if the quantity and the touch location of the multi-touch action satisfy the quantity and the location of the plurality of the unlock points 223 set up by the user setup.

After the step S34, if the multi-touch action does not satisfy the predetermined unlock condition 234, the method moves back to the step S32, the touch panel screen 22 detects an external simultaneous multi-touch action again, and the mobile device 2 remains to be in the lock mode 231. If the multi-touch action satisfies the predetermined unlock condition 234, the control unit 21 controls the mobile device 2 to switch from the lock mode 231 to the unlock mode 232 (step S36). After the step S36, the mobile device 2 is in the unlock mode 232. The user controls the mobile device 2, and is free to use any application program in the mobile device 2.

The unlock method of the present invention provides lock functions with or without password protection, which is details in the following.

According to the present invention, the user has to perform a simultaneous multi-touch action as the unlock action. Accordingly, the quantity of the unlock points 223 is at least two. If the quantity of the plurality of the touch points 222 is the same with the quantity of the unlock points 223, the user performs a multi-touch action by simultaneously touching all the touch points 222 on the touch panel screen 22 to successfully unlock the mobile device 2. Under the circumstance, unlock method does not provide password protection.

Figure 6:
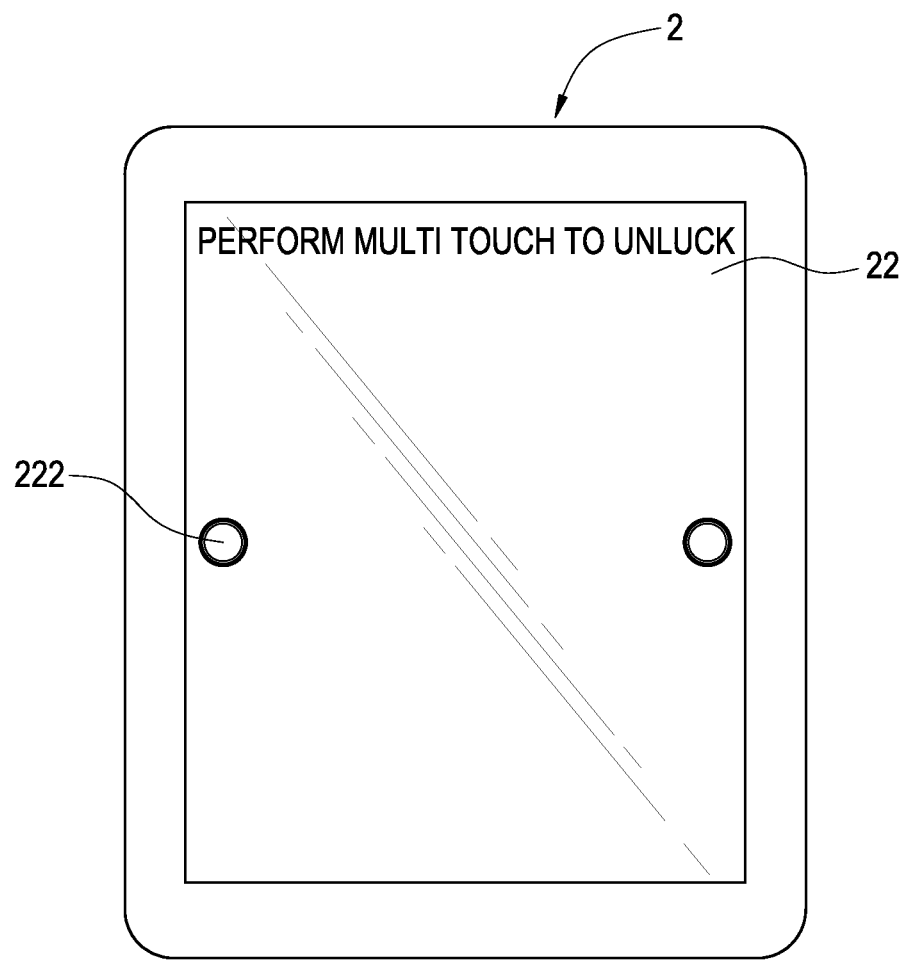
FIG. 6 is a first lock mode schematic diagram of a preferred embodiment according to the present invention.

FIG. 6 is a first lock mode schematic diagram of a preferred embodiment according to the present invention. If the display quantity of the touch points 222 set up by the user is two in the setup mode 233, the quantity of the unlock points 223 is at least two. Accordingly, the quantity of the plurality of the touch points 222 is the same with the quantity of the plurality of the unlock points 223. In the embodiment, the unlock method provides the lock function without password protection.

The setup quantity of the touch points 222 and the unlock points 223 can be larger than two. However, as long as the quantity of the touch points 222 is the same with the quantity of the unlock points 223, the unlock method does not provide password protection according to the present invention.

In details, because the quantity of the plurality of the unlock points 223 is the same with the quantity of the plurality of the touch points 222, when the user performs a multi-touch action by simultaneously touching all the touch points 22 to unlock the mobile device 2, the control unit 21 determines that the multi-touch action satisfies the predetermined unlock condition 234.

Figure 7:
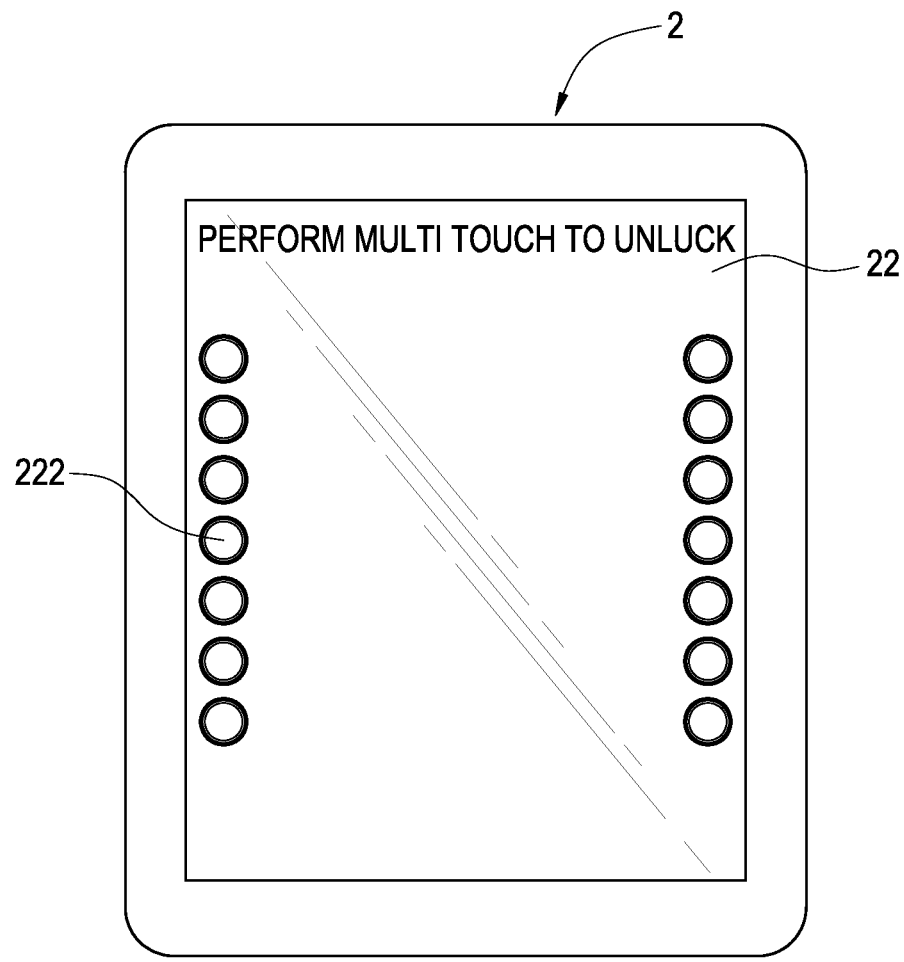
FIG. 7 is a second lock mode schematic diagram of a preferred embodiment according to the present invention.

FIG. 7 is a second lock mode schematic diagram of a preferred embodiment according to the present invention. In the setup mode 233, the display quantity of the plurality of the touch points 222 set up by the user is larger than two, which means is at least three points (the quantity is 12 as shown in the diagram, but is not limited thereto), and, the quantity of the plurality of the unlock points 223 set up is at least two. Accordingly, when the mobile device 2 is in the lock mode 231, the quantity of the plurality of the touch points 222 displayed on the touch panel screen 22 is larger than the quantity of the plurality of the unlock points 223. When the multi-touch action simultaneously touches all the unlock points 223, and the control unit 21 determines the multi-touch action satisfies the predetermined unlock condition 234.

As a result, the quantity and the location of the plurality of the unlock points 223 generates various combinations, whereby the unlock method provides a lock function with password protection according to the present invention. In the embodiment, the user is required to know the correct quantity and the correct location of the plurality of the unlock points 223, then the user is able to correctly touches all the unlock points 223 in the simultaneous multi-touch action to successfully unlock the mobile device. Further, the setup of the mobile device 2 can include that if the quantity of the unlock failure is larger than a certain number, the mobile device 2 is permanently locked so as to assure that the mobile device 2 is not accessed without authorization.

Figure 8:
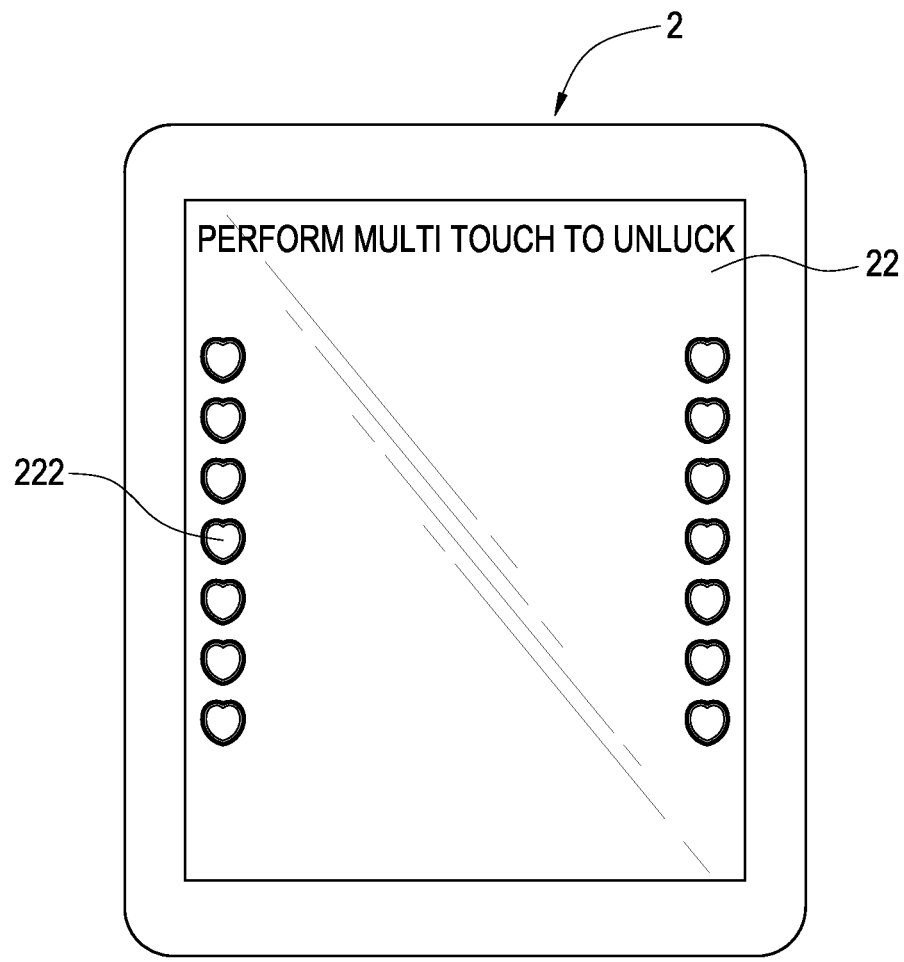
FIG. 8 is a third lock mode schematic diagram of a preferred embodiment according to the present invention.

FIG. 8 to FIG. 11 are respectively schematic diagrams of the third lock mode, the fourth lock mode, the fifth lock mode, and the sixth lock mode according to a preferred embodiment of the present invention. In the embodiment, the plurality of the touch points 222 form a circle displayed on the touch panel screen 22. The patterns formed by the plurality of the touch points 222 can be displayed are subject to the user preferences. As shown in FIG. 8, the plurality of the touch points 222 form a heart pattern for displaying on the touch panel screen 22, and the patterns of the plurality of the touch points 222 can be a star, a polygon or other shapes and is not limited thereto.

Figure 9:
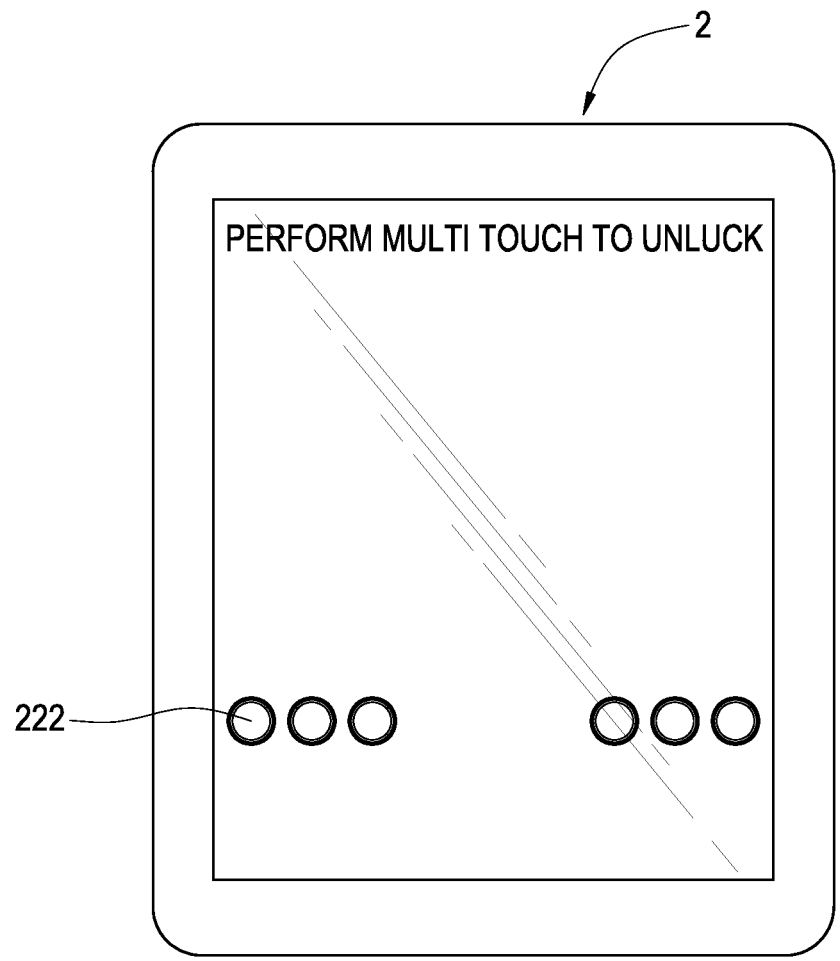
FIG. 9 is a fourth lock mode schematic diagram of a preferred embodiment according to the present invention.
Figure 10:
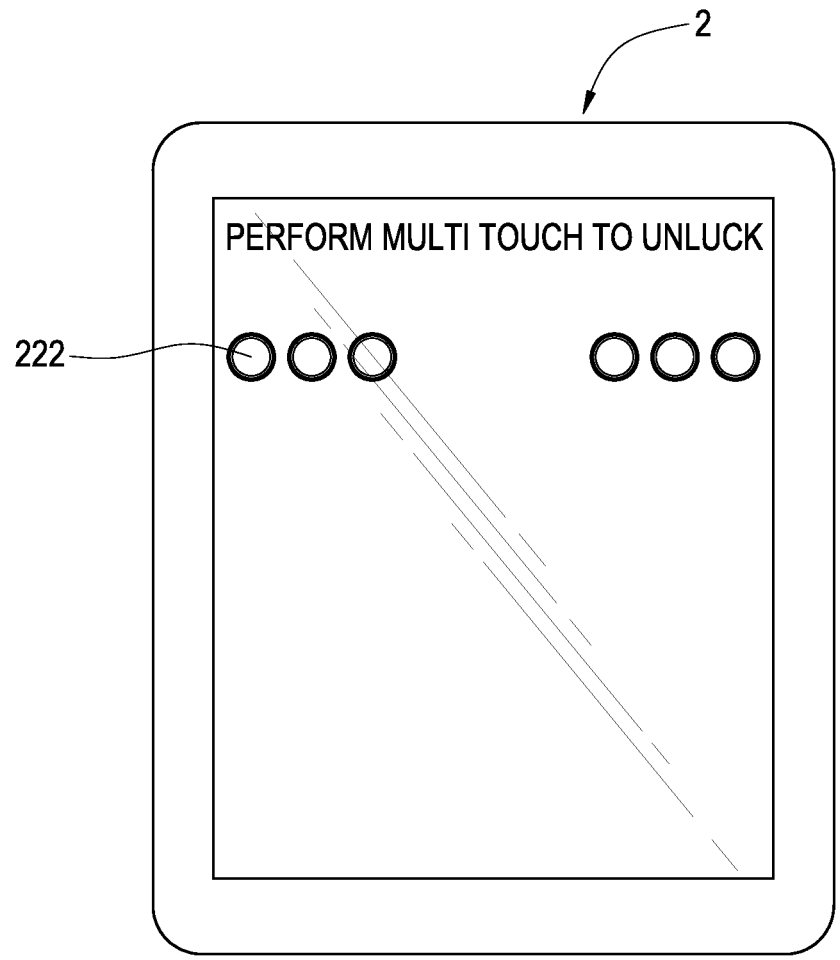
FIG. 10 a fifth lock mode schematic diagram of a preferred embodiment according to the present invention.

In addition, as shown in FIG. 3A, the predetermined distribution of the plurality of the setup points 221 is distributed generally on the touch panel screen 22, the user can set up the location of the plurality of the touch points 222 depending on the requirement or using convenience. FIG. 9 illustrates the predetermined distribution of the plurality of the setup points 221, where the location of the plurality of the touch points 222 can be set up to display on the bottom of the touch panel screen 22. FIG. 10 illustrates the predetermined distribution of the plurality of the setup points 221, where the location of the plurality of the touch points 222 can be set up to display on the top of the touch panel screen 22.

Figure 11:
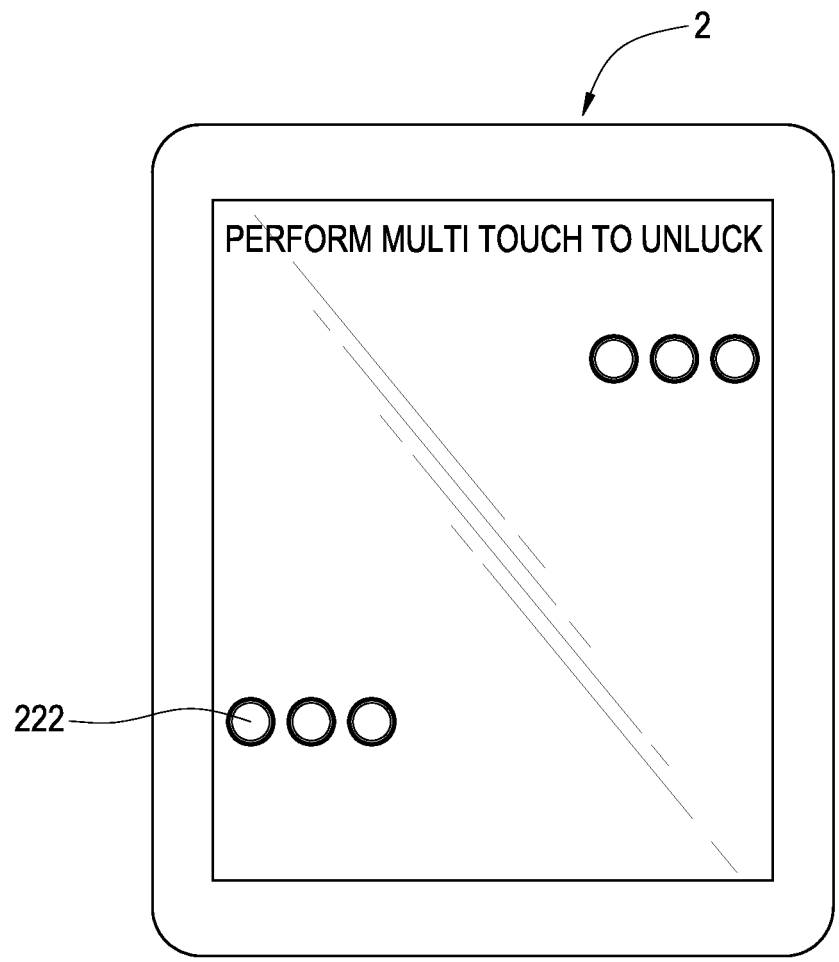
FIG. 11 is a sixth lock mode schematic diagram of a preferred embodiment according to the present invention.

As shown in FIG. 11, the location of the plurality of the touch points 222 can be set up to be respectively displayed on the left lower on the bottom and right upper on the top on the touch panel screen 22, where the user is allow to quickly unlock with a smooth gesture. However, the above description demonstrates preferred embodiments according to the present invention, the patterns of the plurality of the touch points 222 to display can be different (for example using patterns or photos), and the display location can be set up subject to user requirements and the scope is not limited thereto.

In the embodiment shown in FIG. 3A to FIG. 3D, the plurality of the setup points 221 and the plurality of the touch points 222 are round points of the same color. However, depending on the user requirements, the mobile device 2 also provides a customized interface such that the user can further set up the setup points 221 and the touch points 222. For example, the user can define colors or forms (such as patterns or photos) of the plurality of the setup points 221 via the customized interface. When part of the setup points 221 is selected to be the plurality of the touch points 222, the colors and forms of the touch points 222 are different. Accordingly, after the unlock points 223 are set up, if the user has difficulty memorizing the quantity and the location of the unlock points 223, setting up the colors and forms of the touch points 222 can assist with memorizing the unlock points 223 and creates an unique user interface.

In addition, the mobile device 2 is stored with an application program (AP), the application program is controlled by the control unit 21. When the application program is loaded and executed in the mobile device 2, the user is allowed to perform the unlock method for the mobile device according to the present invention.

The method for unlocking the mobile device comprises following step: a) display the plurality of the touch points 222 on the touch panel screen 22; b) the touch panel screen 22 detects an external simultaneous multi-touch action; c) the control unit 21 determines if the multi-touch action satisfies the predetermined unlock condition 234; and, d) if the multi-touch action satisfies the predetermined unlock condition 234, the mobile device 2 switches from the lock mode 231 to the unlock mode 232.

In the unlock methods mentioned above, the quantity of the plurality of the touch points 222 set up is two. The quantity of the plurality of the touch points 222 is the same with the quantity of the plurality of the unlock points 223. In the step c, the two touch points 222 are simultaneously touched in the multi-touch action to satisfy the predetermined unlock condition 234. Under the circumstance, the unlock method provides a lock function without password protection.

Further, the quantity of the touch points 222 set up in the mobile device 2 can be larger than two in the setup mode 233, and the quantity of the unlock points 223 set up is at least two. In the step c, the unlock points 223 are simultaneously touched in the multi-touch action to satisfy the predetermined unlock condition 234. In details, the quantity and the location of the plurality of the unlock points 223 in the multi-touch action has to be correct to satisfy the predetermined unlock condition 234. Under the circumstance, the unlock method provides a lock function with password protection.

Thus, the user uses the simultaneous multi-touch action according to the present invention for shortening the operation time of the unlock action via the unlock method. The user can set up the quantity and the location of the plurality of the touch points 222 and the unlock points 223 to have a lock function with or without password protection.

As the skilled person will appreciate, various changes and modifications can be made to the described embodiments. It is intended to include all such variations, modifications and equivalents which fall within the scope of the invention, as defined in the accompanying claims.

What is claimed is:

1. A method for unlocking a mobile device, the mobile device having a touch panel screen, the method for unlocking the mobile device comprising:
   a0) displaying a plurality of touch points on the touch panel screen;
   a1) detecting an external touch at the plurality of the touch points to set up a quantity and locations of a plurality of unlock points stored as a predetermined unlock condition, the predetermined unlock condition being satisfied when the plurality of the unlock points of the plurality of touch points are touched at the same time;
   a) detecting an external touch action on the plurality of the touch points at the touch panel screen, and the plurality of the unlock points of the plurality of touch points being touched at the same time;
   b) determining if the external touch action satisfies the predetermined unlock condition; and
   c) switching to an unlock mode from a lock mode at the mobile device if the external touch action satisfies the predetermined unlock condition following step b.

2. The method for unlocking a mobile device of claim 1, wherein the quantity of the plurality of the touch points is two.

3. The method for unlocking a mobile device of claim 1, wherein the method further comprises the following steps:
   d) displaying a plurality of setup points to be set up as the plurality of touch points on the touch panel screen; and
   e) detecting an external touch at the plurality of the setup points to set up the display quantity and the display locations of the plurality of the touch points, wherein the display quantity of the plurality of the touch points is larger than two and the quantity of the unlock points is at least two.

4. The method for unlocking a mobile device of claim 3, wherein, the predetermined unlock condition is satisfied when the plurality of the unlock points are all touched at the same time in the external touch action in the step b.

5. The method for unlocking a mobile device of claim 3, wherein the method further comprises a step e1): hiding the plurality of the setup points which are not set up as the plurality of the touch points after the step e.

6. The method for unlocking a mobile device of claim 1, wherein the plurality of the touch points are displayed in patterns as a circle, a heart, a star or a polygon on the touch panel screen.

7. A mobile device, comprising:
   a touch panel screen detecting an external touch action;
   a memory unit installed with a predetermined unlock condition, a lock mode, and an unlock mode; and
   a control unit, electrically connected to the touch panel screen and the memory unit,
   wherein, when the mobile device is in the lock mode, the control unit determines if the external touch action satisfies the predetermined unlock condition, and the mobile device switches to the unlock mode when the external touch action satisfies the predetermined unlock condition, and
   wherein the touch panel screen displays a plurality of touch points enabled by an external touch to set up a quantity and locations of a plurality of unlock points stored as the predetermined unlock condition, and the predetermined unlock condition being satisfied when the plurality of unlock points of the plurality of touch points are touch at the same time by the external touch action.

8. The mobile device of claim 7, wherein the memory unit further is stored with a setup mode, when the mobile device is in the setup mode, the touch panel screen detects the external touch to set up the predetermined unlock condition.

9. The mobile device of claim 8, wherein, the touch panel screen displays a plurality of setup points enabled by the external touch to set up the plurality of touch points, and the plurality of touch points are enabled again by other external touch to set up the plurality of unlock points when the mobile device is in the setup mode.

10. An application program stored in a mobile device, a method for unlocking the mobile device having a touch panel screen is executed when the application program is loaded and executed in the mobile device, the method for unlocking the mobile device comprising:
   a0) displaying a plurality of the setup points on the touch panel screen;
   a1) detecting an external touch at the plurality of the setup points to set up a display quantity and display locations of a plurality of touch points;
   a3) detecting other external touch at the plurality of the touch points to set up a quantity and locations of a plurality of unlock points stored as a predetermined unlock condition, the predetermined unlock condition being satisfied when the plurality of the unlock points are touched at the same time;
   a) displaying the plurality of the touch points on the touch panel screen;
   b) detecting an external touch action at the touch panel screen;
   c) determining if the external touch action satisfies the predetermined unlock condition; and
   d) switching to an unlock mode from a lock mode at the mobile device if the external touch action satisfies the predetermined unlock condition, following step c.

11. The application program of claim 10, wherein the quantity of the plurality of the displayed touch points is two, and the step c in the method for unlocking the mobile device is touching the two touch points at the same time in the external touch action to satisfy the predetermined unlock condition.

12. The application program of claim 10,
   wherein the display quantity of the plurality of the touch points is larger than two, and
   the quantity of the plurality of the unlock points is at least two.

* * * * *